(12) United States Patent
Lee (10) Patent No.: US 12,303,345 B1
(45) Date of Patent: May 20, 2025

(54) DENTAL TREATMENT TRAY

(71) Applicant: Sean S. Lee, San Bernardino, CA (US)

(72) Inventor: Sean S. Lee, San Bernardino, CA (US)

( * ) Notice: Subject to any disclaimer, the term of this patent is extended or adjusted under 35 U.S.C. 154(b) by 0 days.

(21) Appl. No.: 18/753,936

(22) Filed: Jun. 25, 2024

Related U.S. Application Data (60) Provisional application No. 63/556,769, filed on Feb. 22, 2024.

(51) Int. Cl.
A61C 19/06 (2006.01)

(52) U.S. Cl.
CPC .................. A61C 19/066 (2013.01)

(58) Field of Classification Search
CPC ..... A61C 19/06; A61C 19/063; A61C 19/066; A61C 19/08
See application file for complete search history.

(56) References Cited

U.S. PATENT DOCUMENTS

| | | | |
|---|---|---|---|
| 4,376,628 A | 3/1983 | Aardse | |
| 5,018,967 A | 5/1991 | Schwalbach | |
| 5,076,791 A | 12/1991 | Madray, Jr. | |
| 5,165,424 A | 11/1992 | Silverman | |
| 5,323,787 A | 6/1994 | Pratt | |
| 5,460,527 A * | 10/1995 | Kittelsen | A63B 71/085 128/862 |
| 5,575,655 A | 11/1996 | Darnell | |
| 5,702,251 A | 12/1997 | McClintock | |
| 5,707,235 A | 1/1998 | Knutson | |
| 5,816,802 A | 10/1998 | Montgomery | |
| 5,895,218 A * | 4/1999 | Quinn | A61C 19/063 433/80 |
| 6,126,443 A | 10/2000 | Burgio | |
| 6,142,780 A | 11/2000 | Burgio | |
| 6,354,837 B1 | 3/2002 | Jensen | |
| 6,386,869 B1 | 5/2002 | Zegarelli | |
| D509,000 S | 8/2005 | Barnes | |
| 7,020,963 B2 * | 4/2006 | Cleary | A61C 7/146 29/527.1 |
| 8,602,774 B2 | 12/2013 | Wasylucha | |
| 2003/0205234 A1 * | 11/2003 | Bardach | A61J 7/0053 128/861 |
| 2010/0055634 A1 * | 3/2010 | Spaulding | A61C 7/08 433/5 |
| 2019/0247173 A1 * | 8/2019 | Zegarelli | A61C 19/066 |

(Continued)

FOREIGN PATENT DOCUMENTS

WO    WO-0009036 A1 *    2/2000    ........... A61C 19/063

*Primary Examiner* — Heidi M Eide (57) ABSTRACT

A tray made with prescribed and customized depths and sizes of the tab containing reservoir for controlled delivery and amounts of the therapeutic agents, including but not limited to, calcium, antibiotics, fluoride, desensitizer, and bleaching gel to each tooth. The tray includes a mesh in the reservoir that holds the therapeutic agents within the reservoir. The mesh may keep therapeutic agents' strength from the dilution by influx of saliva. The oriented materials improve the efficiency of transportation of the treatment agents. The tray is made based on the customized tab that determines the depth and size of the reservoir. The customized reservoir may be fabricated by spacer tab made of polymer material such as polyvinyl chloride (PVC). There may be several depths of the tabs and may be color-coded from 0.1 to 0.9 mm.

7 Claims, 10 Drawing Sheets

(56) References Cited

U.S. PATENT DOCUMENTS

| | | | |
|---|---|---|---|
| 2022/0241060 A1* | 8/2022 | Kim | A61C 19/066 |
| 2023/0190434 A1* | 6/2023 | Sato | A61C 19/066 433/80 |

* cited by examiner

```
┌─────────────────────────────────────────────────────────────┐
│ Identify at Least One Tooth in Need of Treatment Following a Dental │
│ Examination, Wherein the at Least One Tooth Belongs to a Set of Teeth │
│     That Are Either Maxillary Teeth or Mandibular Teeth 902 │
└─────────────────────────────────────────────────────────────┘
                              ▼
┌─────────────────────────────────────────────────────────────┐
│ Position a Dental Impression Tray Comprising Dental Putty Over the Set │
│ of Teeth and Held in Place Until the Dental Putty Sets Before Removing │
│        It to Create a Dental Impression of the Set of Teeth 904 │
└─────────────────────────────────────────────────────────────┘
                              ▼
┌─────────────────────────────────────────────────────────────┐
│          Create a Dental Mold From the Dental Impression 906 │
└─────────────────────────────────────────────────────────────┘
                              ▼
┌─────────────────────────────────────────────────────────────┐
│  Select at Least One Tab Based on Tab Depth to Be Applied to the at │
│        Least One Tooth on the Corresponding Dental Mold 908 │
└─────────────────────────────────────────────────────────────┘
                              ▼
┌─────────────────────────────────────────────────────────────┐
│ Apply the at Least One Tab to the at Least One Tooth on Buccal Side of │
│  the at Least One Tooth on the Dental Mold to Create a Modified Dental │
│                          Mold 910 │
└─────────────────────────────────────────────────────────────┘
                              ▼
┌─────────────────────────────────────────────────────────────┐
│    Fabricate a Dental Treatment Tray Comprising a Reservoir │
│   Corresponding to the at Least One Tooth, From the Modified Dental │
│    Mold by Applying a Thermoplastic Material Over the Modified Dental │
│                          Mold 912 │
└─────────────────────────────────────────────────────────────┘
                              ▼
┌─────────────────────────────────────────────────────────────┐
│ Position at Least One Medication and a Therapeutic/Treatment Agent │
│   Orienting Material Within the Reservoir of the Dental Treatment Tray │
│          and Sealing the Reservoir With a Removable Film 914 │
└─────────────────────────────────────────────────────────────┘
```

DENTAL TREATMENT TRAY

The current application claims a priority to the U.S. provisional patent application Ser. No. 63/556,769, filed Feb. 22, 2024.

FIELD OF THE INVENTION

The present invention generally relates to a tray that is made for prescribed and customized depths and sizes of a tab containing a reservoir for each tooth.

BACKGROUND OF THE INVENTION

The aesthetic value of whitened visible tooth surfaces has led to the development of a number of techniques for whitening ranging from the application of plastic veneers to the visible surfaces of the teeth to whitening toothpastes. Many of these techniques employ bleaching involving the application of gels to the visible teeth surfaces.

Traditional bleaching trays ineffectively deliver therapeutic agents on tooth surface because of unknown depths and imprecise amounts of the therapeutic agents, which caused tooth sensitivity and gum tissue erosion. Among these are U.S. Pat. No. 5,575,655 to Darnell, U.S. Pat. No. 5,702,251 to McClintock II, U.S. Pat. No. 5,707,235 to Knutson, U.S. Pat. No. 5,816,802 to Montgomery, U.S. Pat. No. 6,354,837 to Jensen, U.S. Pat. No. 5,018,967 to Schwalbach; Stephen, U.S. Pat. No. 5,323,787 to Pratt; Andrea P, U.S. Pat. No. 5,165,424 to Silverman; Harvey N., U.S. Pat. No. 4,376,628 to Aardse; Henri J., 5575655 to Darnell; Daniel H., U.S. Pat. No. 5,076,791 to Madray, jr.; George et al. All of these inventions are related in some methods and devices to the treatment of teeth. The closest in nature to the present invention is in U.S. Pat. No. 5,816,802 to Montgomery and U.S. Pat. No. 5,323,787 to Pratt et al. Montgomery's invention discloses a flexible duplex dental tray that has two surfaces for depositing dentally therapeutic compositions within the upper and lower troughs of the tray. Trough in the Montgomery's invention is similar to the reservoir of the present invention but the trough in the Montgomery's invention is not customized and controls the dosage of the therapeutic agents inefficiently.

The present invention may be customized and may control the dosage of the prescribed therapeutic agents. Pratt's invention discloses an apparatus including a mouthpiece and storage container for protecting and treating teeth. The storage container in Pratt's invention is also similar to the reservoir of the present invention, but the storage container also is not customized and cannot control the dosage inside the reservoir. While the prior disclosed examples attempt to offer a solution, their obvious shortcomings are not easily addressed. Therefor a need exists for a tooth tray treatment system that is able to overcome the shortcomings of aforementioned examples.

SUMMARY OF THE INVENTION

A dental treatment tray is a tray that is made for prescribed and customized depths and sizes of a reservoir for each tooth. Dentists and physicians have considered the precise reservoir to control the intensity and amounts of therapeutic agents, including but not limited to, antibiotic gels or chips, calcium to strengthen the teeth, fluoride, desensitizer, chlorhexidine, and bleaching gel to each tooth. The present invention provides different depths and sizes of the tab based on the prescriptions for each tooth. A mesh in the reservoir holds the therapeutic agents in the reservoir. An exact dosage of the therapeutic agents may be prescribed by the healthcare providers for each tooth. A healthcare provider may control the amount of the therapeutic agents by the depths and sizes of the tab. The tray may be made based on the customized tab while the proper amount and types of agents for each tooth may facilitate higher efficiency. The customized reservoir may be fabricated by a spacer tab made of polymer material, including but not limited to, polyvinyl chloride (PVC). One side of the spacer tab is a peel-off formed for each patient's tooth. The present invention may also provide nine customized depths of the tab that may be color-coded from 0.1 millimeters (mm) to 0.9 mm, where 0.1 mm may be red, while 0.9 mm may be white. To avoid inaccuracy, the colors' order is the same as seven rainbow colors and added black and white to make nine thickness layers.

In brief, a thickness spacer tab is provided for use with the cast stone model. The thickness spacer tab comprises a set of such tabs of varying thicknesses for creating reservoirs of varying depths. The aperture or dimension of the tabs is also provided in varying sizes approximating the permanent and primary teeth.

In accordance with features of the present invention, the thickness spacer tab facilitates tooth arch tray fabrication customized to deliver ideal therapeutic agent doses to meet the specific treatment delineations of each tooth in the arch.

BRIEF DESCRIPTION OF THE DRAWINGS

To easily identify the discussion of any particular element or act, the most significant digit or digits in a reference number refer to the figure number in which that element is first introduced.

DETAILED DESCRIPTION OF THE INVENTION

All illustrations of the drawings are for the purpose of describing selected versions of the present invention and are not intended to limit the scope of the present invention.

A method of creating a dental treatment tray involves identifying at least one tooth in need of treatment following a dental examination, wherein the at least one tooth belongs to a set of teeth that are either maxillary teeth or mandibular teeth The method positions a dental impression tray comprising dental putty over the set of teeth and held in place until the dental putty sets before removing it to create a dental impression of the set of teeth. The method creates a dental mold from the dental impression. The method selects at least one tab based on tab depth to be applied to the at least one tooth on the corresponding dental mold. The method applies the at least one tab to the at least one tooth on buccal/lingual side of the at least one tooth on the dental mold to create a modified dental mold. The method fabricates a dental treatment tray comprising a reservoir corresponding to the at least one tooth, from the modified dental mold by applying a thermoplastic material over the modified dental mold. The method positions at least one medication and a therapeutic/treatment agent orienting material within the reservoir of the dental treatment tray and sealing the reservoir with a removable film.

In an embodiment of the method of creating a dental treatment tray the tab depth of the at least one tab ranges between 0.9 millimeter (mm) to 0.1 mm in depth. In an embodiment of the method of creating a dental treatment tray the at least one tab is color coded corresponding to the depth of the at least one tab.

In an embodiment of the method of creating a dental treatment tray the therapeutic/treatment agent orienting material is configured to direct the flow of the at least one medication perpendicular to the surface of the at least one tooth.

In an embodiment of the method of creating a dental treatment tray the removable film is removed perform applying the dental treatment tray to the set of teeth.

In an embodiment of the method of creating a dental treatment tray the therapeutic/treatment agent orienting material is a polymer mesh.

In an embodiment of the method of creating a dental treatment tray the therapeutic/treatment agent orienting material is a sponge.

A dental treatment tray comprises a formed body, at least one reservoir, at least one therapeutic/treatment agent, a therapeutic/treatment agent orienting material, and a thin protective film. The formed body comprises an internal surface, a lingual boundary, facial boundary, and facial margin. The at least one reservoir may be formed within the internal surface. The therapeutic/treatment agent may be positioned within the at least one reservoir with the therapeutic/treatment agent orienting material. The therapeutic/treatment agent and the therapeutic/treatment agent orienting material may be bounded within the at least one reservoir by the thin protective film.

In an embodiment of the dental treatment tray, the at least one reservoir is configured with a reservoir depth ranging between 0.9 mm to 0.1 mm.

In an embodiment of the dental treatment tray, the reservoir depth differs between at least two reservoirs.

In an embodiment of the dental treatment tray, wherein the therapeutic/treatment agent orienting material is a polymer mesh.

In an embodiment of the dental treatment tray, the therapeutic/treatment agent orienting material can be a sponge.

In an embodiment of the dental treatment tray, the at least one therapeutic/treatment agent may be fluoride, ozone, hydrogen peroxide, carbamide peroxide, potassium nitrate, an amorphous calcium phosphate, caseinphosphopeptide-ACP, and dryobalanops aromatic gaertn.

In an embodiment of the dental treatment tray, the at least one reservoir is positioned to a corresponding tooth of a patient.

A method of using a dental treatment tray may involve providing a dental treatment tray comprising a formed body, at least one reservoir, at least one therapeutic/treatment agent, therapeutic/treatment agent orienting material, and a thin protective film, wherein the formed body comprises a facial margin, a lingual boundary, a facial boundary, and an internal surface. The method prepares a set of teeth to be utilized to create the dental treatment tray to receive the dental treatment tray by cleaning and rinsing the set of teeth. The method removes the thin protective film from within the internal surface exposing the therapeutic/treatment agent orienting material and the at least one therapeutic/treatment agent within the at least one reservoir. The method aligns the internal surface of the formed body with the set of teeth such that at least one tooth in need of treatment is aligned with at least one reservoir. The method pushes the formed body onto the set of teeth until surface of the at least one tooth is in contact with the therapeutic/treatment agent orienting material and the at least one therapeutic/treatment agent. The method maintains the dental treatment tray on the set of teeth for a predetermined amount of time associated with prescribed treatment of the at least one therapeutic/treatment agent. The method removes the dental treatment tray from the set of teeth following the passing of the predetermined amount of time associated with prescribed treatment of the at least one therapeutic/treatment agent.

In an embodiment of the method of utilizing a dental treatment tray, the at least one therapeutic/treatment agent may be fluoride, ozone, hydrogen peroxide, carbamide peroxide, potassium nitrate, an amorphous calcium phosphate, caseinphosphopeptide-ACP, and dryobalanops aromatic gaertn.

In an embodiment of the method of utilizing a dental treatment tray, the at least one reservoir is configured with a reservoir depth ranging between 0.9 mm to 0.1 mm.

In an embodiment of the method of utilizing a dental treatment tray, the reservoir depth may differ between reservoirs associated with different teeth.

In an embodiment of the method of utilizing a dental treatment tray, the therapeutic/treatment agent orienting material is a polymer mesh.

In an embodiment of the method of utilizing a dental treatment tray, the therapeutic/treatment agent orienting material is a sponge.

The present invention provides different depths and sizes of the tab based on the prescriptions for each tooth. Mesh in the reservoir holds the therapeutic agents in the reservoir.

The customized reservoir can be fabricated by a spacer tab made of polymer material, including but not limited to, polyvinyl chloride (PVC). One side of the spacer tab is a peel-off adhesive surface, which sticks on the stone mode. Different sizes and depths of the tab are identified by colors. Four sizes of the tab are created based on the width and a height of the patient's each tooth. Nine different depths of the tab are color-coded from 0.1 mm (red) to 0.9 mm (white).

In an embodiment, there may be four different sizes of the tab are created according to the widths and heights of the teeth; these are marked as L for large, ML for medium-large, MS for medium-small, and S for small.

In an embodiment, there may be nine depths for the tab that are identified and distinguished by different colors. Color-coded nine depths to easy identification of depths without measuring are; 0.1 mm (red); 0.2 mm (orange); 0.3 mm (yellow); 0.4 mm (green); 0.5 mm (blue); 0.6 mm (indigo); 0.7 mm (violet); 0.8 mm (black); and 0.9 mm (white).

In an embodiment, the reservoirs may be filled and sealed by a mesh with prescribed therapeutic gels. The targeted tooth is treated which the exact dosage of therapeutic agents, differentiated with other teeth.

The customized reservoir of the tray contains, including but not limited to, sponge, mesh and orientation polymer in the reservoir to hold treatment agents. Mesh will be intermingled with therapeutic material in the reservoir. It may function as a backbone/frame holding material. Since most of the materials are gel or thick liquid form. It may hold at the place longer time and release slowly otherwise the liquid form of therapeutic material will flow out from the reservoir.

The tray with orientation of internal texture perpendicular to the surface of teeth can be utilized by adding orientation materials in the reservoir. The orientation increases the delivery direction of the therapeutic agents, including but not limited to, whitening agents and fluorides.

The protective film may be covered on the adhesive side that is by spraying with non-hardening glue.

A dental treatment tray includes a thickness spacer tab for custom-depth reservoir in a dental treatment tray is made of PVC. They may be fabricated to correspond to the universal tooth numbers of the dental arch in four sizes for both permanent and primary teeth. This tab may be provided in nine thicknesses for each size and color coded: 0.1 mm (red), 0.2 mm (orange), 0.3 mm (yellow), 0.4 mm (green), 0.5 mm (blue), 0.6 mm (indigo), 0.7 mm (violet), 0.8 mm (black), and 0.9 mm (white). All tabs may be pre-contoured to better adapt to each tooth. One side of the spacer tab is peeled-off to expose an adhesive surface for the tab to stick to the stone model upon which the tray is formed.

The dental treatment tray includes a plurality of tabs that may be utilized to form different even depths within a treatment tray that allow for different prescribed quantities of medication. The elements that might be added as options for the dental treatment tray include increasing gradations of size (beyond current four shapes) and thickness (beyond current nine depths); however, the elements can be attached (stacked into dual or triple layers) to create greater depths if needed. Each component (tooth) works independently. A doctor can choose the depth and width for the needed spacer tab.

The dental treatment tray provides a way to make a reservoir in a dental treatment tray for the controlled (Dr's prescription) application of therapeutic agents (for example, fluoride, desensitizer, bleaching gel) to a single tooth in a precision dosage. Also, the perimeters of the reservoir made using this dental treatment tray are linear, gently curving to match the edge of the tooth shape. The healthcare professional or laboratory technician might make this dental treatment tray using prosthetic veneers of various sizes and depths to cast a mold into which PVC is poured. The hardened PVC tab is released from the mold, inspected and trimmed as needed. Using multiple sizes and depth veneers, multiple sizes and depth tabs are created. Using multiple colors of PVC, multiple-colored tabs are created for ease of rapid identification by the healthcare professional when creating a custom-size reservoir depth. The peel-off adhesive side is made by spraying the back of the tabs with a nonhardening glue and covering them with a thin nonstick plastic that is peeled off when readying the tabs for immediate use. If not stored for later use, the back of the tab can be simply sprayed with adhesive and used immediately. The increasing depth component of the series of spacer tabs is important for its relationship to increasing therapeutic dosage in the resulting reservoir. When picking the tab desired for the creation of a precision reservoir, the healthcare professional considers the intensity of the therapeutic effect required by an individual's tooth. After using the custom-made dental treatment tray with a reservoir made using the dental treatment tray, the healthcare professional can gauge the therapeutic effect. If necessary, a new tray with a different depth reservoir can be fabricated using another spacer tab so that a repeated treatment can produce a different therapeutic outcome.

A person could contract with a dental laboratory or manufacturer to produce the design of this dental treatment tray in mass quantities to keep on hand for custom-dental treatment tray fabrication. Or he or she could make a model for creating a spacer tab on a patient-by-patient basis. With use of a veneer and an impression of the patient's tooth in the arch as a stencil, a mold can be made, and liquid polyvinyl chloride plastic can be poured into the mold. When it hardens, pop it out, inspect it, trim it and spray it with adhesive on the backside. Press it against the stone cast model of the patient's tooth upon which the vacuum-formed dental treatment tray will be made. The resulting dental treatment tray will have a precision reservoir of the size and depth of the therapeutic application parameters desired.

The spacer tab can be identified with different colors. Spray glue might be used instead of a sticky side with a peel-off strip. It could be made thicker or in a wider size. It can be made of a different material instead of PVC.

A person would use the dental treatment tray in the following way. First, a stone-cast model of the patient's full tooth arch is made. Second, the tooth needing a different dosage of therapeutic agent from the teeth adjacent to it is identified in the model. Next, the spacer tab dental treatment tray is chosen that most closely fits the target tooth size (about 1 mm shy from the gingivae) and also that is a depth that will produce a reservoir that holds from 0.1-0.9 mm depth of extra therapeutic agent. Finally, the peel-off strip is removed to expose the adhesive side of the dental treatment tray, and it is pressed against the targeted tooth on the stone model. The dental treatment tray is created over the stone model using the vacuum-forming process. A precision space-a reservoir-remains where the spacer tab had been on the model. Now, the healthcare professional can fill the dental treatment tray with therapeutic gel and press the patient's tooth arch into the gel-filled tray with the targeted tooth being exposed to an increased dosage of therapeutic agent compared to the adjacent teeth. The outcome will be site-specific, even-layered coverage with smooth borders-a highly noticeable result in treatments. It is possible that the spacer tab could be used differently or in the model- and mold-making processes of fabrication/manufacturing in other fields.

When people get their teeth treated with therapeutic gel-whether fluoride, desensitizer or bleaching agent-either all teeth receive the same dosage of therapeutic material by a non-custom-made tray or a handmade dental treatment tray can be made to include a reservoir for adding extra gel to one tooth needing it. In tooth bleaching, in the former, the one tooth does not get proper dose and still appears darker than others; in the latter, a handmade reservoir can create an unsightly "raisin-pattern" effect on the final outcome. For additional description of the problem this dental treatment tray solves, here is some background about the fabrication process of a dental treatment tray. Healthcare professionals and dental laboratory technicians custom-fabricate tooth arch trays to fit a patient's dentition. Such trays are used to deliver therapeutic gels across the arch. When one tooth needs additional therapeutic agent, a hand-held syringe is used to paint resin onto a stone cast model of the patient's teeth and gum during the fabrication process so that a reservoir will result when the tray is vacuum-formed on the model. With the final tray, the needed additional therapeutic collects in the reservoir against the targeted tooth. Unfortunately, hand-application of viscous resin often results in uneven surfaces and unknown thicknesses, ragged margins and sharp spikes in the final reservoir (Refer to the photograph called FIG. 1 included with this application to see the syringe used for hand-painting resin). This means the therapeutic agent is applied in a dosage of uneven thickness and effect. Furthermore, the agent is applied without continuous, straight-lined borders. In bleaching treatment, for example, the tooth treated with an unknown amount of therapeutic gel in such a misshapen reservoir can appear to be "tattooed" with the undesirable "white raisin" pattern as a result of this problem.

The dental treatment tray, which may be called a "spacer tab", is a reservoir-modeling device that provides a solid form that adheres upon the target tooth in a stone model. When a dental treatment tray is vacuum formed over the stone model, the reservoir results where the spacer tab had been in place. When the tray is filled with therapeutic gel and the patient's tooth arch is pressed into the tray, the reservoir will be the precise depth for the desired dose and size dimension to match the tooth as prescribed by the doctor-eliminating the possible "white raisin", or uneven pattern in bleaching. For additional description of how the ideal dental treatment tray solves the problem of the handmade reservoir, here is further explanation. The uniform thickness spacer tab, made of PVC, will be available in nine thicknesses and four size dimensions to fit all tooth sizes. It is provided for use in the fabrication of dental treatment tray reservoirs. These tabs eliminate the step that involved potentially shaky handheld syringe painting of resin to create a reservoir. The reservoir resulting with use of this spacer tab is always of the precision depth desired, for a smooth, even application of therapeutics, such as bleaching gel, preventing the "white raisin" effect and with a clean border for a proper seal from saliva or other food residue ingress.

No spacer tabs or buttons currently exist for adhesion to the stone model prior to vacuum-forming the dental treatment tray to create a customized tray with the precisely desired depth and size reservoir for applying the correct therapeutic dosage needed to a specific tooth in a dental treatment tray. Various products involving hand-painting resin using a syringe while attempting to roughly approximate the depth and size reservoir desired are used that result in glob—shaped reservoirs that will deliver "guesstimated" dosages of therapeutic when used to treat a patient.

Over-the-counter dental treatment trays are one-size-arch fits all. If used for tooth whitening, excess bleaching agent is forced out of these trays when pushed against the teeth, some expectorated, some swallowed, and some contacting the gingivae-a primary source of tissue irritation, erosion and pain. There is lingering concern on cancer caused by these excess active ingredients (hydrogen peroxide) in the gel. Currently existing in the dental office is the system of making a custom-made dental treatment tray to fit the patient's own arch, but when the bleaching gel is highly viscous or when a dark or more sensitive tooth occasionally needs a reservoir created in the dental treatment tray fabrication process to allow room for extra bleaching gel (or desensitizer or fluoride) against this specific tooth, the healthcare professional-made tray system is flawed by its imprecise outcome. The current method used is to squeeze some resin out of a syringe to "hand paint" a reservoir in the dental treatment tray fabrication step. This produces inconsistent results that differ from the desired reservoir dimension, due to the challenge in flawlessly hand-painting a certain shape with precise and even borders and depth desired. Utilizing a spacer tab instead of manual hand painting allows for a more predictable and controlled coverage of the whole tooth with even borders and a depth measured to synchronize with the precise additional dosage of therapeutic agent needed. The dosage increases with the thickness of the tab, which is offered is nine depth sizes, each one expanding by a tenth of a millimeter. Furthermore, there are four different width sizes for each depth size.

Healthcare professionals and patients do not enjoy predictable precision results from a customized dose delivery of a therapeutic agent to individual teeth in a tooth arch tray with a reservoir shaped with the delivery of hand-painted resin. In tooth treatment tray creation, using prefabricated spacer tabs that create reservoirs with the precise size corresponding to permanent and primary teeth dimensions and depth desired for proper dosage produces a predictable shape, and even coloration and intensity of whitening on the targeted tooth in the arch. The outcome, or treatment result, is predictable. The dental treatment tray is also a time-saving device as its use will produce a higher percentage of successful treatments involving dental treatment trays, resulting in the need for fewer repeated treatments.

Figure 1:
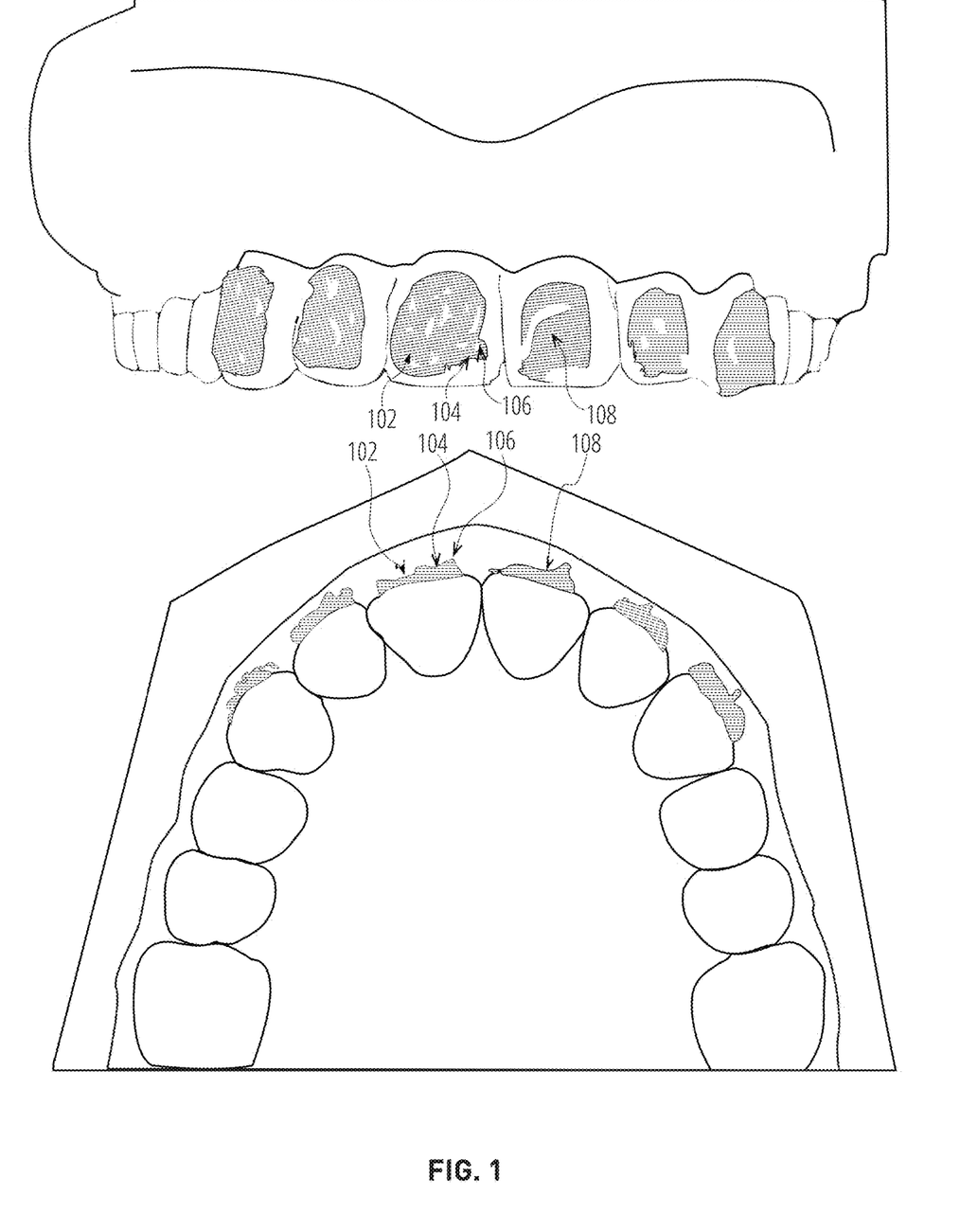
FIG. 1 illustrates a prior art method of creating a tab painted on the surface of a patient's teeth mold.

All illustrations of the drawings are for the purpose of describing selected versions of the present invention and are not intended to limit the scope of the invention. Referring now to FIG. 1, a front and top view of a conventional method to create a tab, shows uneven surface 102, ragged margin 104, sharp spike 106 and unknown depths 108. FIG. 1 shows outcomes of the traditional hand-painting of resin. This means the therapeutic agents will be applied unevenly. Inexact and imprecise traditional method to create a tab may result in unknown depths 108, sharp spikes 106 and ragged margins 104. Furthermore, the treatment agents may be applied to the teeth in a non-prescribed way. For example, in bleaching teeth with the undesirable "white raisin" pattern may appear.

Figure 2:
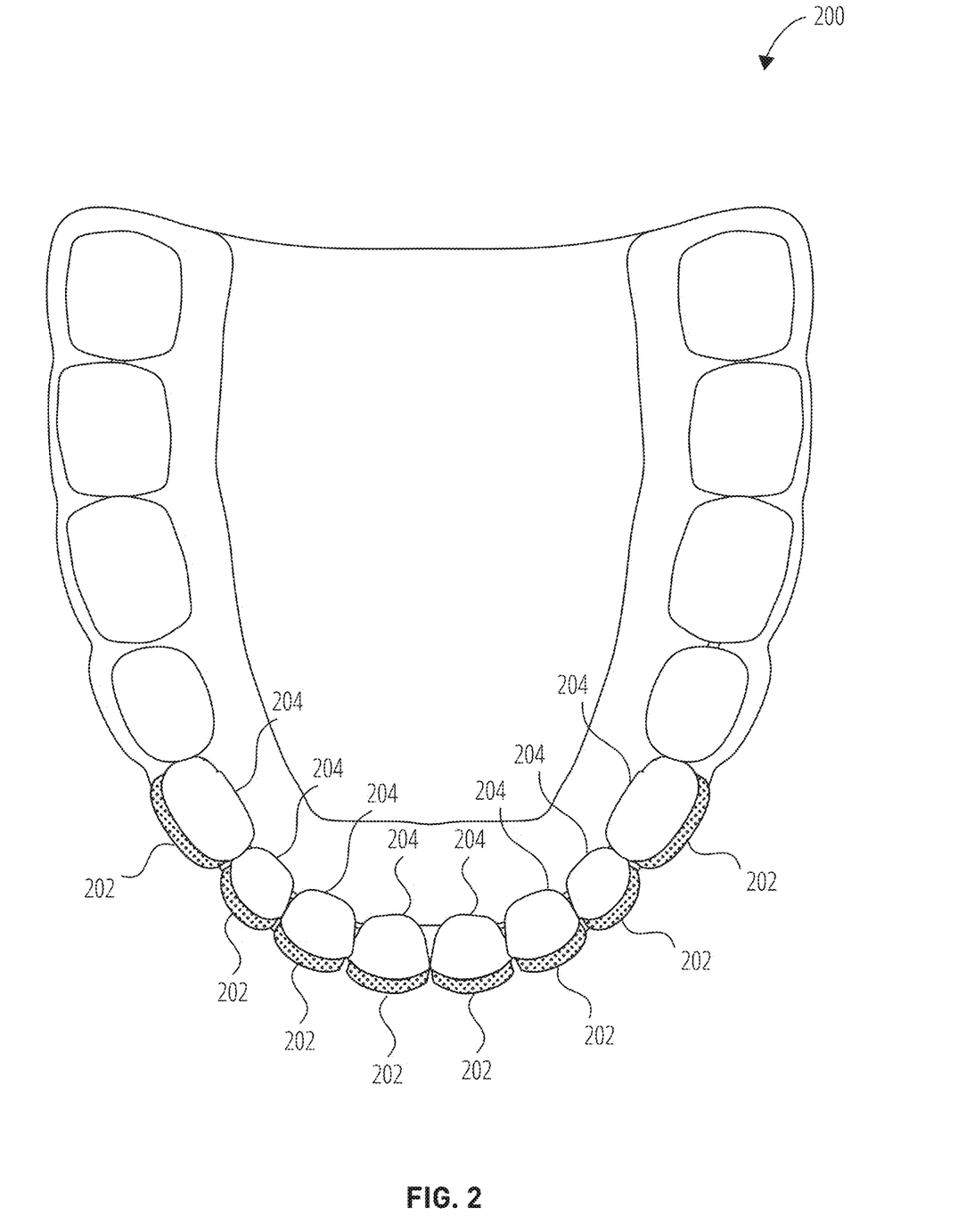
FIG. 2 illustrates a modified dental mold 200 in accordance with one embodiment.

FIG. 2 illustrates a top view of a modified dental mold 200 in accordance with one embodiment. The modified dental mold 200 is shown with the addition of the tab 202 to at least one tooth 204 in need of treatment. The selection of the tab 202 is determined based on the prescribed dosages of the therapeutic/treatment agent by a healthcare provider. The tab 202 may differ in the depths and sizes. Four different tabs 202 may be selected according to the widths and heights of the teeth. In some configurations, these tabs 202 may marked as L for large, ML for medium-large, MS for medium-small, and S for small. In some configurations, the tabs 202 may be configured in nine different depths and each of the different depths may be identified and distinguished by different colors. For example, the color-coded nine depths may be 0.1 mm (red); 0.2 mm (orange); 0.3 mm (yellow); 0.4 mm (green); 0.5 mm (blue); 0.6 mm (indigo); 0.7 mm (violet); 0.8 mm (black); and 0.9 mm (white). The addition of color coding allows the provider to determine the depth without measurement based on the color alone.

Figure 3:
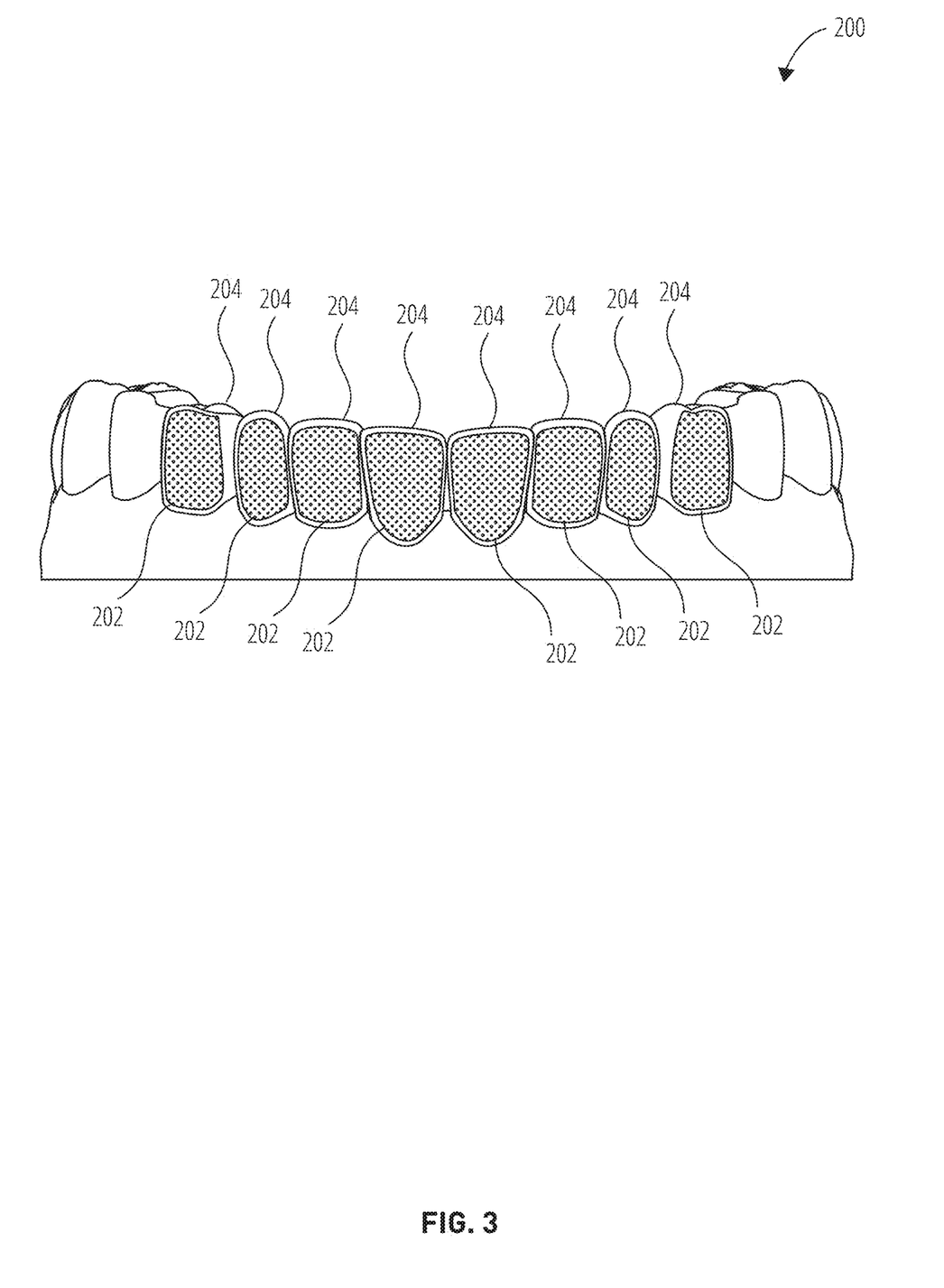
FIG. 3 illustrates the modified dental mold 200 in accordance with one embodiment.

FIG. 3 illustrates a front view of the modified dental mold 200 in accordance with one embodiment.

Figure 4:
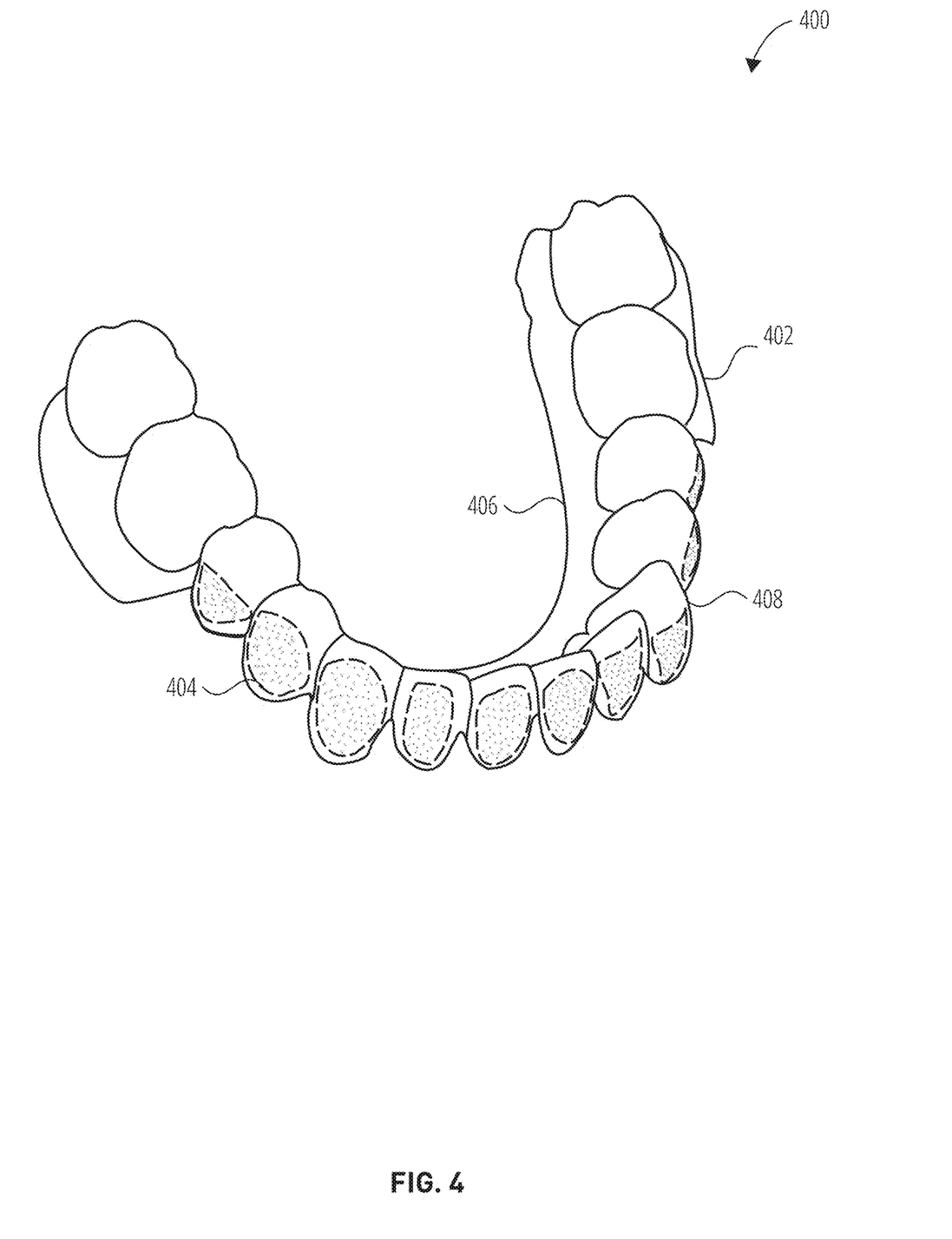
FIG. 4 illustrates a dental treatment tray 400 in accordance with one embodiment.

FIG. 4 shows a dental treatment tray 400 with uniform reservoir 404 and polymer, and the cross-section of the tray. It shows the reservoir 404 for better retention of the treatment agents. The dental treatment tray 400 has extended parts beyond the lingual boundary 406 and up to the first molar of facial boundary 402. The extended part may get more retention to enhance stability and facilitate application of the therapeutic agents to the intended area. Facial margin 408 is cut above gum line shy to gingival margin in the final tray to prevent irritating gums caused by the overflow the therapeutic agents.

The dental treatment tray 400 orients therapeutic/treatment agent through internal textures that run perpendicular to the surface of teeth. This may be accomplished by adding therapeutic/treatment agent orienting material in the reservoir 404. The therapeutic/treatment agent orienting material increases the delivery rate of the therapeutic/treatment agent. These therapeutic/treatment agents include but are not limited to, whitening agents and fluorides. A healthcare provider has to estimate the dosages of the treatments for each tooth and determine the depth and size of the reservoir 404 of the tab. After impression of the patient's teeth, a stone cast model is made based on the impression. The tab is created over the stone cast model according to the healthcare provider's prescription and the reservoir of the tab is made by a vacuum forming process. Healthcare provider prescribes the dosage of the therapeutic agents for each tooth that determines the size and depth of the reservoir in the tab. The customized final tray is made over the tab. The precise size and depth of the tray for each tooth are completed. The edge of the tooth may be matched linearly to the curve of the tab. Then the reservoirs are filled and sealed by the mesh with prescribed therapeutic agents. The targeted tooth is treated with the prescribed dosage of the therapeutic agent differentiated from other teeth.

In an embodiment, a dental treatment tray may be customized to the depths and sizes of the reservoir 404 containing a mesh as the therapeutic/treatment agent orienting material to hold the therapeutic/treatment agent. In an embodiment, a customized uniform spacer tab may be used within the reservoir. The tab may be color-coded to assist with the loading of the treatment agent. In an embodiment, a material reservoir may be provided with an orientation of internal textures perpendicular to the surface of the teeth. In some embodiments the treatment agent may be fluoride, ozone, hydrogen peroxide, carbamide peroxide, potassium nitrate, an amorphous calcium phosphate, caseinphosphopeptide-ACP, and dryobalanops aromatic gaertn as well as another suitable agent.

Figure 5:
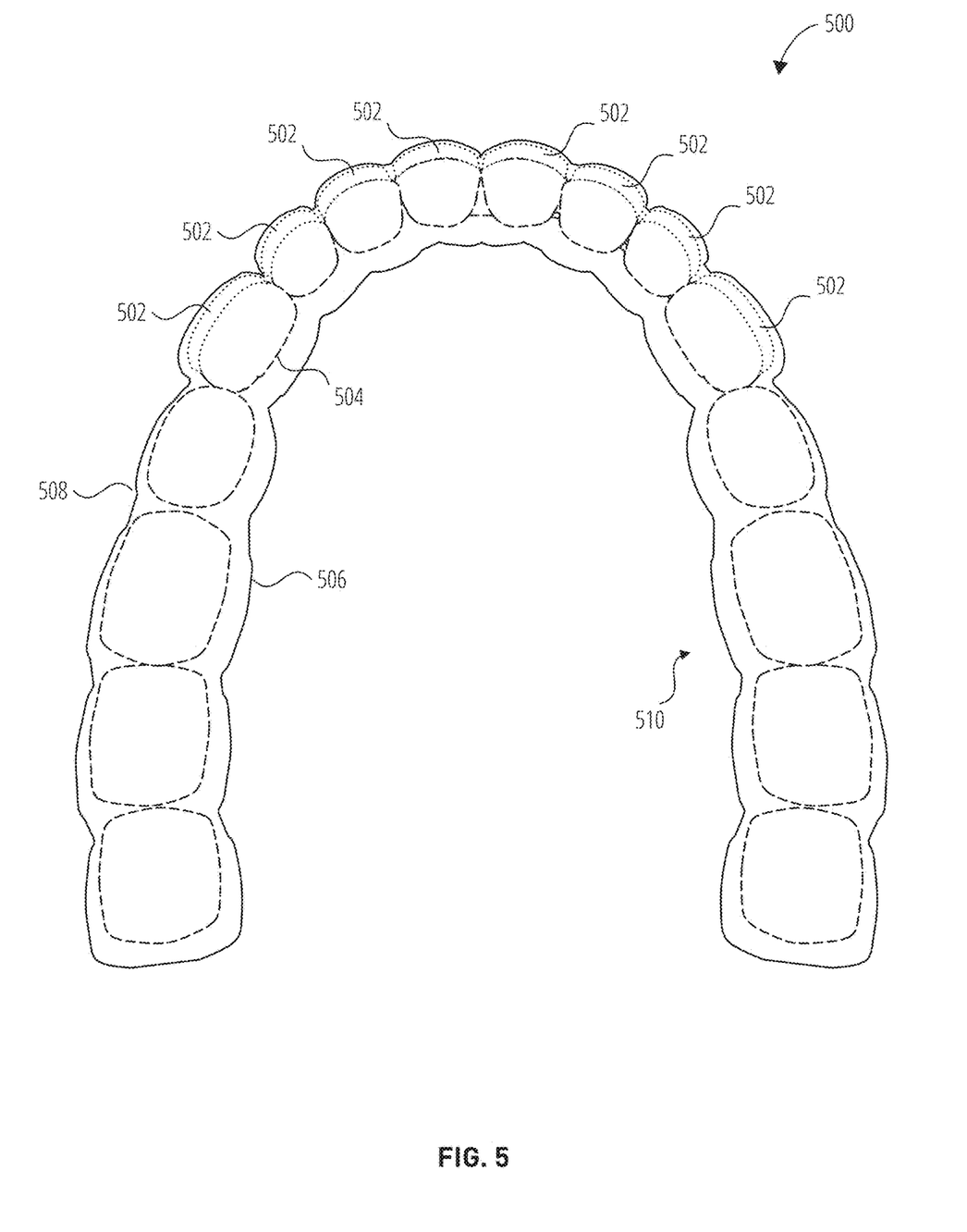
FIG. 5 illustrates a dental treatment tray 500 in accordance with one embodiment.

FIG. 5 illustrates a dental treatment tray 500 in accordance with one embodiment. The dental treatment tray 500 comprises a formed body 510 with an internal surface 504, a lingual boundary 506, and a facial boundary 508. The reservoir 502 is shown within the internal surface 504 and abuts with the material of the formed body 510. The reservoir 502 in the dental treatment tray 500 is empty but will be loaded with the therapeutic/treatment agent and a therapeutic/treatment agent orienting material and then sealed with a thin protective film.

Figure 6:
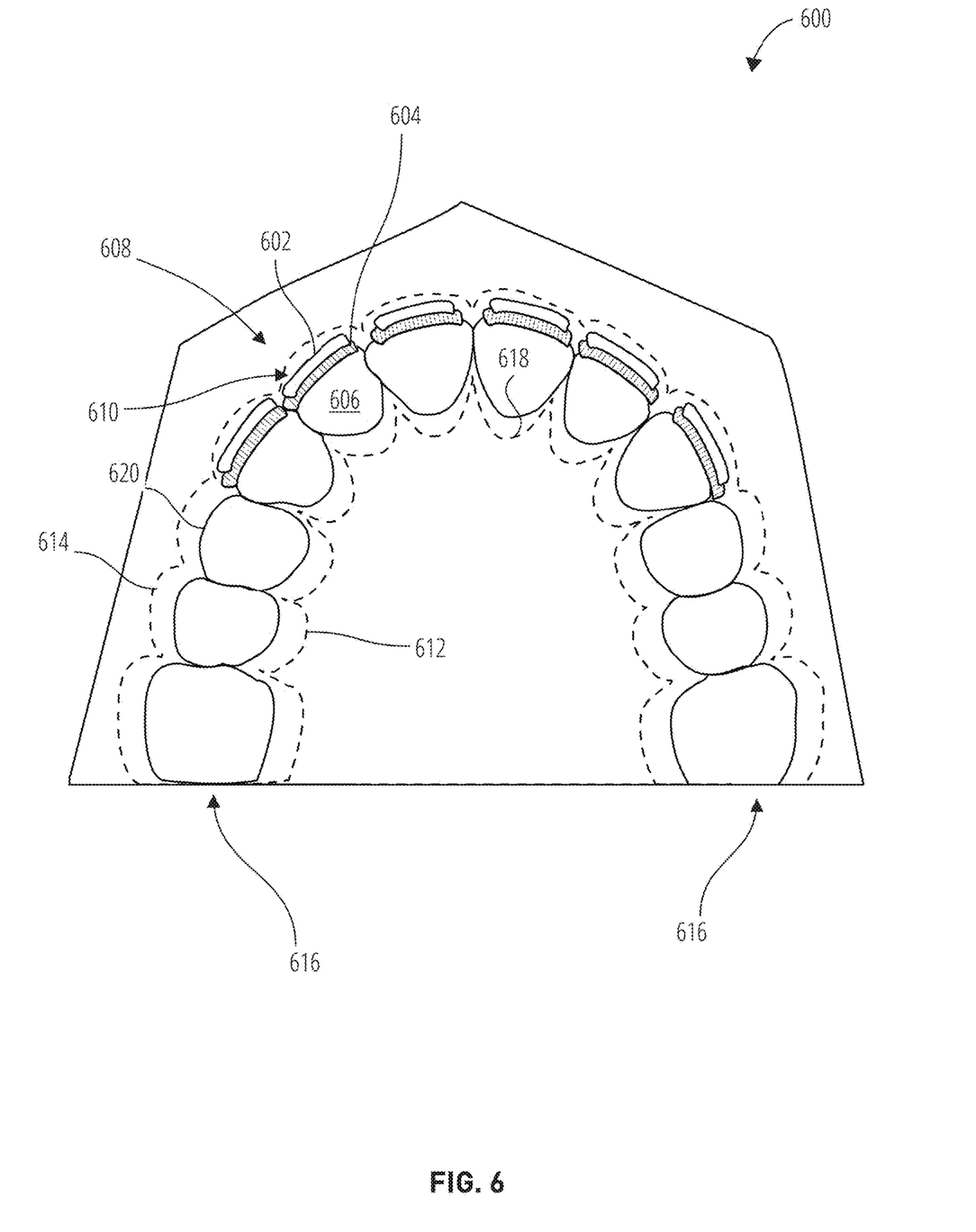
FIG. 6 illustrates a dental treatment tray 600 in accordance with one embodiment.

FIG. 6 illustrates an embodiment of the dental treatment tray 600. A dental treatment tray 600 is shown installed on a set of teeth 616. The dental treatment tray 600 comprises a formed body 608 with a facial boundary 614, a lingual boundary 612, and an internal surface 618. The internal surface contacts with the teeth of the set of teeth 616. Within the internal surface 618, there is at least one reservoir 610 positioned against an at least one tooth 606. The least one reservoir 610 includes a therapeutic/treatment agent orienting material 604 and a therapeutic/treatment agent 602. In essence, a therapeutic/treatment agent orienting material 604 contains a therapeutic/treatment agent 602. They are one body. In an embodiment, the therapeutic/treatment agent orienting material 604 is a mesh. The mesh is positioned such that the orientation of internal mesh texture is perpendicular to the at least one tooth 606. The positioning of the mesh allows for the tooth surface 620 to be in contact with the therapeutic/treatment agent orienting material 604 with the therapeutic/treatment agent 602.

The therapeutic/treatment agent orienting material 604 is utilized as a way of increasing the delivery rate of the therapeutic/treatment agent 602, including but not limited to, whitening agents and fluorides. A healthcare provider has to estimate the dosages of the treatments for each tooth and determine the depth and size of the reservoir of the tab. After impression of the patient's teeth, a stone cast model is made based on the impression. The tab is created over the stone cast model according to the prescription and the reservoir of the tab is made by a vacuum forming process. Prescription for the dosage of the therapeutic/treatment agent 602 for each tooth which determines the size and depth of the reservoir in the tab. The customized final tray is made over the tab. The precise size and depth of the tray for each tooth are completed. The edge of the tooth may be matched linearly to the curve of the tab. Then the reservoirs are filled by the mesh with prescribed therapeutic gels and sealed. The targeted tooth is treated with the precise dosage of the therapeutic/treatment agent 602 differentiated with other teeth.

Figure 7:
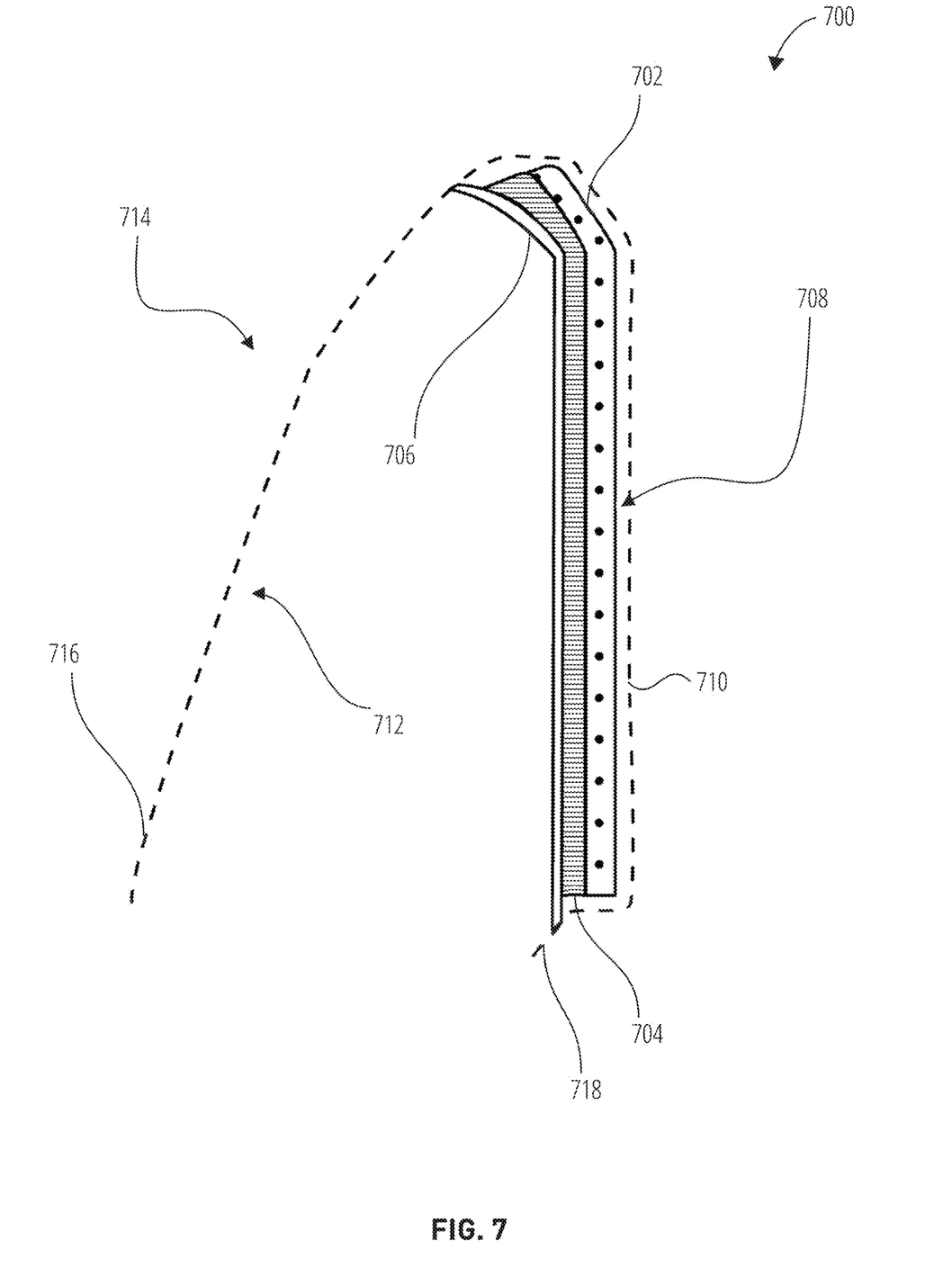
FIG. 7 illustrates a sectional view of a dental treatment tray 700 in accordance with one embodiment.

FIG. 7 illustrates a sectional view of a dental treatment tray 700. The dental treatment tray 700 includes a formed body 714 a lingual boundary 716, a facial boundary 718, a facial margin 710, and an internal surface 712. The reservoir 708 includes a therapeutic/treatment agent 702 and a therapeutic/treatment agent orienting material 704 sealed within the reservoir 708 with a thin protective film 706. The reservoir 708 is positioned adjacent to the facial margin 710 of the formed body 714. The thin protective film 706 is covered on the adhesive side that is by spraying with non-hardening glue.

Figure 8:
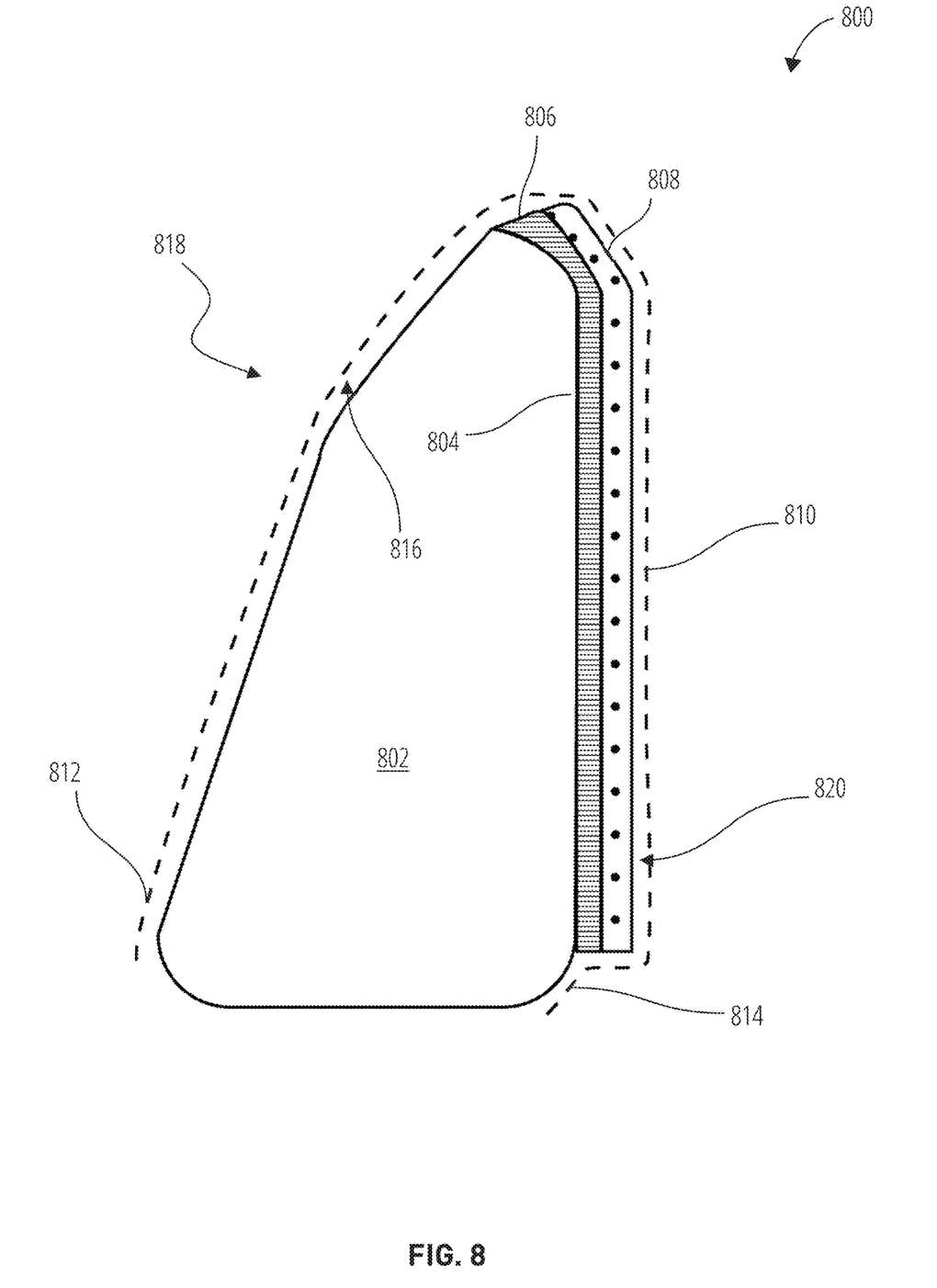
FIG. 8 illustrates a sectional view of a dental treatment tray 800 in accordance with one embodiment.

FIG. 8 illustrates a sectional view of a dental treatment tray 800 mounted on a tooth 802. The formed body 818 comprises an internal surface 816, a lingual boundary 812, a facial boundary 814, and a facial margin 810. The tooth 802 comprises a tooth surface 804 that is positioned against the internal surface 816 and the reservoir 820 comprising the therapeutic/treatment agent orienting material 806 and the therapeutic/treatment agent 808. The tooth 802 is covered by a formed body 818 of the dental treatment tray 800. The therapeutic/treatment agent orienting material 806 is positioned with the therapeutic/treatment agent 808 within the reservoir 820. The therapeutic/treatment agent orienting material 806 is oriented against the tooth surface 804 and forms a permeable boundary for the therapeutic/treatment agent 808. The therapeutic/treatment agent orienting material 806 is semi-permeable but encloses the therapeutic/treatment agent 808 against the formed body 818 within the reservoir 820. The therapeutic/treatment agent orienting material 806 allows for the slow diffusion of the therapeutic/treatment agent 808 across the therapeutic/treatment agent orienting material 806 to interact with the tooth surface 804 as prescribed.

Figure 9:
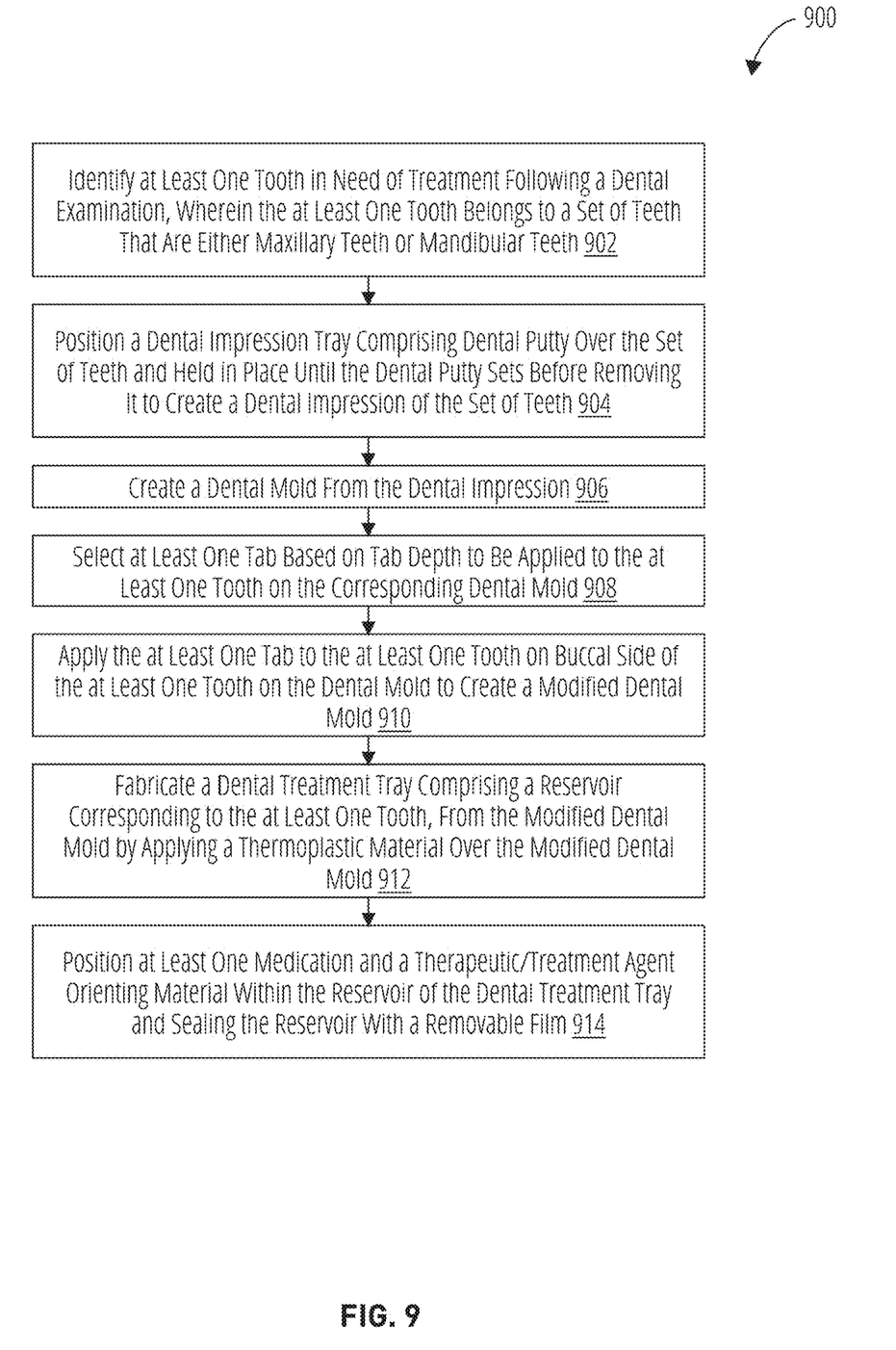
FIG. 9 illustrates a method 900 for creating a dental treatment tray in accordance with one embodiment.

FIG. 9 illustrates a method 900 for creating a dental treatment tray. In block 902, the method 900 identifies at least one tooth in need of treatment following a dental examination, wherein the at least one tooth belongs to a set of teeth that are either maxillary teeth or mandibular teeth. In block 904, the method 900 positions a dental impression tray comprising dental putty over the set of teeth and hold in place until the dental putty sets before removing it to create a dental impression of the set of teeth. In block 906, the method 900 creates a dental mold from the dental impression. In block 908, the method 900 selects at least one tab based on tab depth to be applied to the at least one tooth on the corresponding dental mold. In block 910, the method 900 applies the at least one tab to the at least one tooth on buccal side of the at least one tooth on the dental mold to create a modified dental mold. In block 912, the method 900 fabricates a dental treatment tray comprising a reservoir corresponding to the at least one tooth, from the modified dental mold by applying a thermoplastic material over the modified dental mold. In block 914, the method 900 positions at least one medication and a therapeutic/treatment agent orienting material within the reservoir of the dental treatment tray and sealing the reservoir with a removable film.

Figure 10:
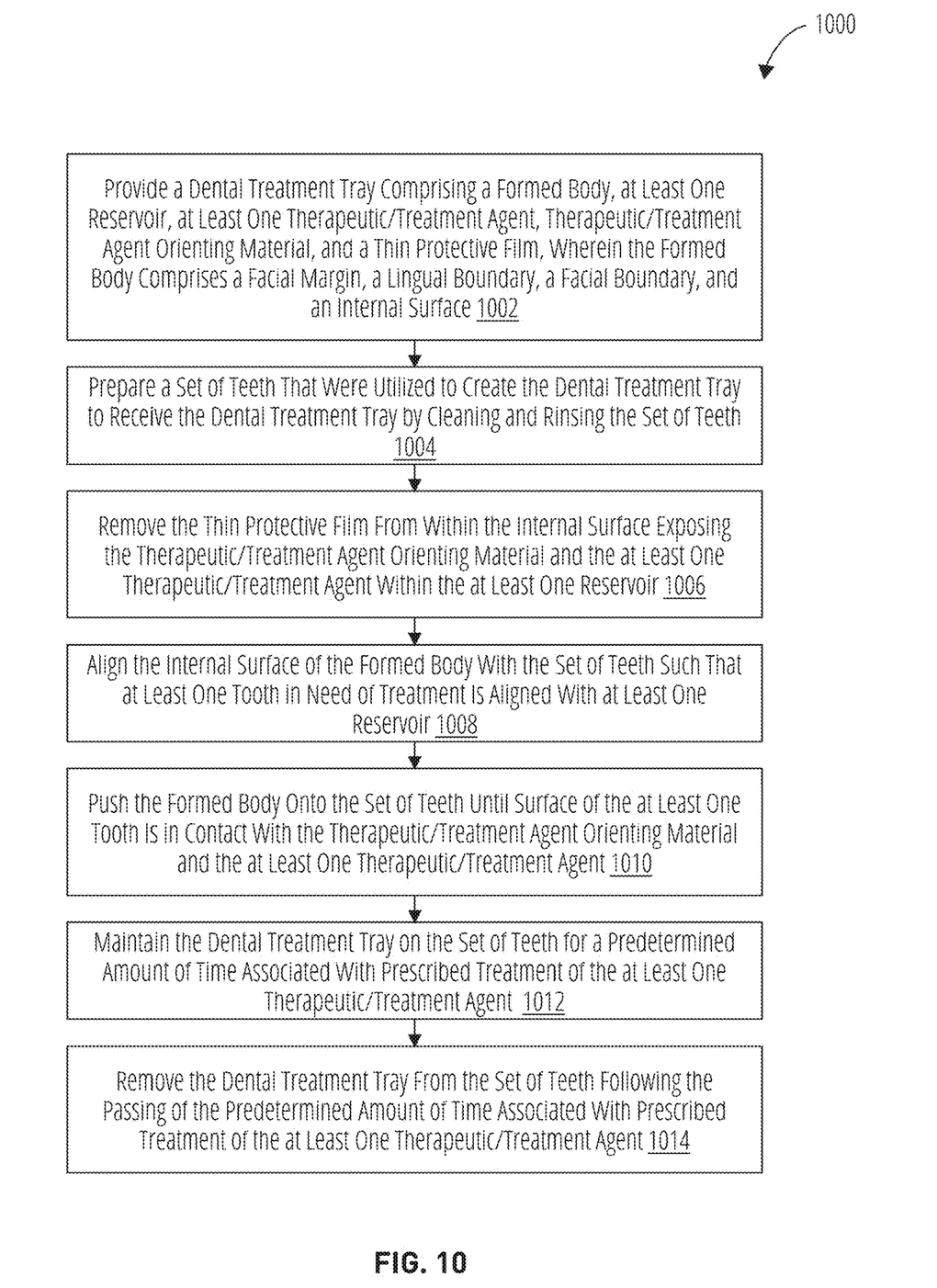
FIG. 10 illustrates a method 1000 for utilizing a dental treatment tray in accordance with one embodiment.

FIG. 10 illustrates a method 1000 of utilizing a dental treatment tray in accordance with one embodiment. In block 1002, the method 1000 provides a dental treatment tray comprising a formed body, at least one reservoir, at least one therapeutic/treatment agent, therapeutic/treatment agent orienting material, and a thin protective film, wherein the formed body comprises a facial margin, a lingual boundary, a facial boundary, and an internal surface. In block 1004, the method 1000 prepares a set of teeth that were utilized to create the dental treatment tray to receive the dental treatment tray by cleaning and rinsing the set of teeth. In block 1006, the method 1000 removes the thin protective film from within the internal surface exposing the therapeutic/treatment agent orienting material and the at least one therapeutic/treatment agent within the at least one reservoir. In block 1008, the method 1000 aligns the internal surface of the formed body with the set of teeth such that at least one tooth in need of treatment is aligned with at least one reservoir. In block 1010, the method 1000 pushes the formed body onto the set of teeth until surface of the at least one tooth is in contact with the therapeutic/treatment agent orienting material and the at least one therapeutic/treatment agent. In block 1012, the method 1000 maintains the dental treatment tray on the set of teeth for a predetermined amount of time associated with prescribed treatment of the at least one therapeutic/treatment agent. In block 1014, the method 1000 removes the dental treatment tray from the set of teeth following the passing of the predetermined amount of time associated with prescribed treatment of the at least one therapeutic/treatment agent. Although the invention has been explained in relation to its preferred embodiment, it is to be understood that many other possible modifications and variations can be made without departing from the spirit and scope of the invention as hereinafter claimed.

What is claimed is:

1. A method of creating a dental treatment tray, the method comprising the steps of:
    (A) identifying at least one tooth in need of treatment following a dental examination, wherein the at least one tooth belongs to a set of teeth that are either maxillary teeth or mandibular teeth;
    (B) positioning a dental impression tray comprising dental putty over the set of teeth and held in place until the dental putty sets before removing the dental impression tray to create a dental impression of the set of teeth;
    (C) creating a dental mold from the dental impression;
    (D) selecting at least one spacer tab from a plurality of spacer tabs based on a prescribed amount of medication to be applied to the at least one tooth and a size of the at least one tooth on the corresponding dentist mold, and wherein the plurality of spacer tabs are spacer tabs with different tab thicknesses and different tab sizes, and wherein a color code for the plurality of spacer tabs is used to visually indicate the different tab thicknesses, and wherein a size marking system for the plurality of spacer tabs is used to visually indicate the different tab sizes;
    (E) applying the at least one spacer tab to the at least one tooth on buccal or lingual side of the at least one tooth on the dental mold to create a modified dental mold;
    (F) fabricating a dental treatment tray comprising a reservoir corresponding to the at least one tooth, from the modified dental mold by applying a thermoplastic material over the modified dental mold;
    (G) positioning at least one medication and a therapeutic/treatment agent orienting material within the reservoir of the dental treatment tray and sealing the reservoir with a removable film; and
    (H) sequentially executing steps (A) through (G).

2. The method of claim 1, wherein the color code for the plurality of spacer tabs includes red for a tab thickness of 0.1 millimeters (mm), orange for a tab thickness of 0.2 mm, yellow for a tab thickness of 0.3 mm, green for a tab thickness of 0.4 mm, blue for a tab thickness of 0.5 mm, indigo for a tab thickness of 0.6 mm, violet for a tab thickness of 0.7 mm, black for a tab thickness of 0.8 mm, and white for a tab thickness of 0.9 mm.

3. The method of claim 1, wherein the size marking system for the plurality of spacer tabs includes a large tab size, a medium-large tab size, a medium-small tab size, and a small tab size.

4. The method of claim 1, wherein the therapeutic/treatment agent orienting material is configured to direct the flow of the at least one medication perpendicular to the surface of the at least one tooth.

5. The method of claim 1, wherein the removable film is removed before applying the dental treatment tray to the set of teeth.

6. The method of claim 1, wherein the therapeutic/treatment agent orienting material is a polymer mesh.

7. The method of claim 1, wherein the at least one medication is selected from a group consisting of fluoride, ozone, hydrogen peroxide, carbamide peroxide, potassium nitrate, an amorphous calcium phosphate, caseinphosphopeptide-ACP, and dryobalanops aromatic gaertn.

* * * * *